May 7, 1935.  E. J. WHITE ET AL  2,000,154
PICK-UP AND DELIVERY SYSTEM
Filed April 16, 1934  3 Sheets-Sheet 3
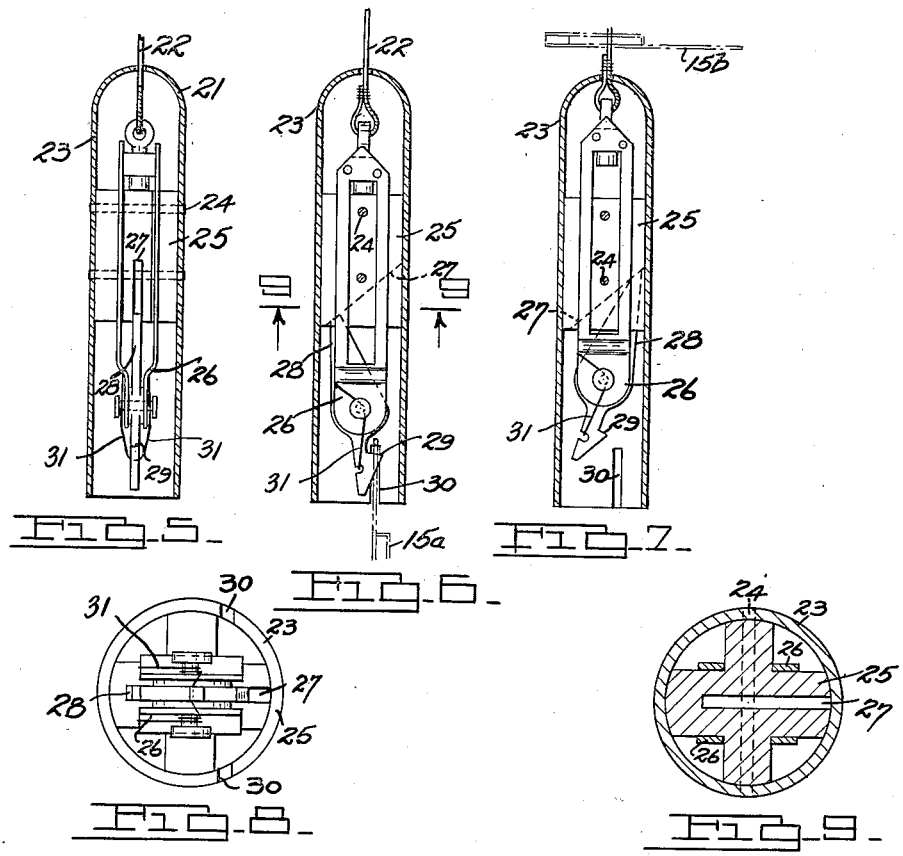
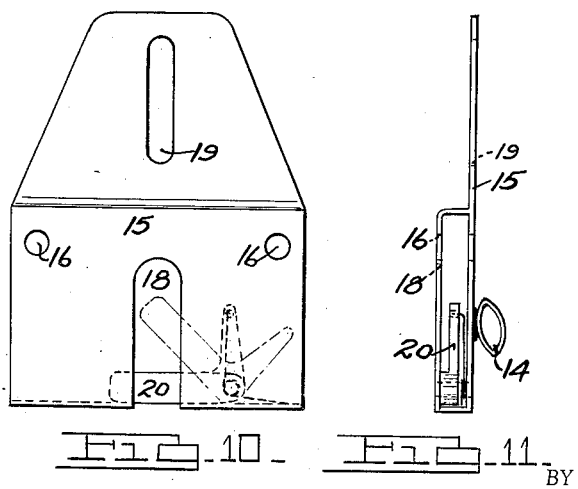
INVENTORS
Edward J. White
Arthur S. Garove
BY
*[signature]*
ATTORNEY.

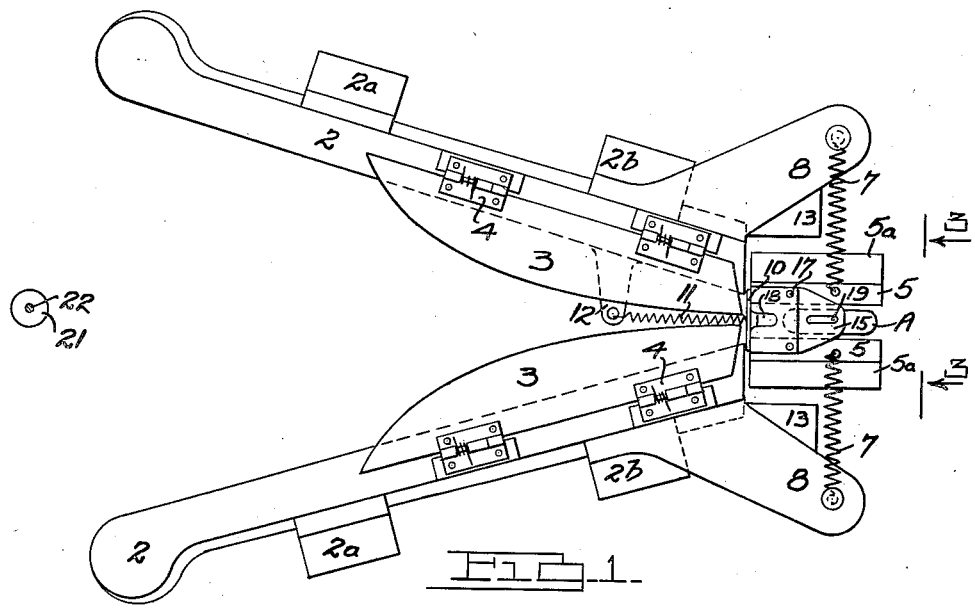

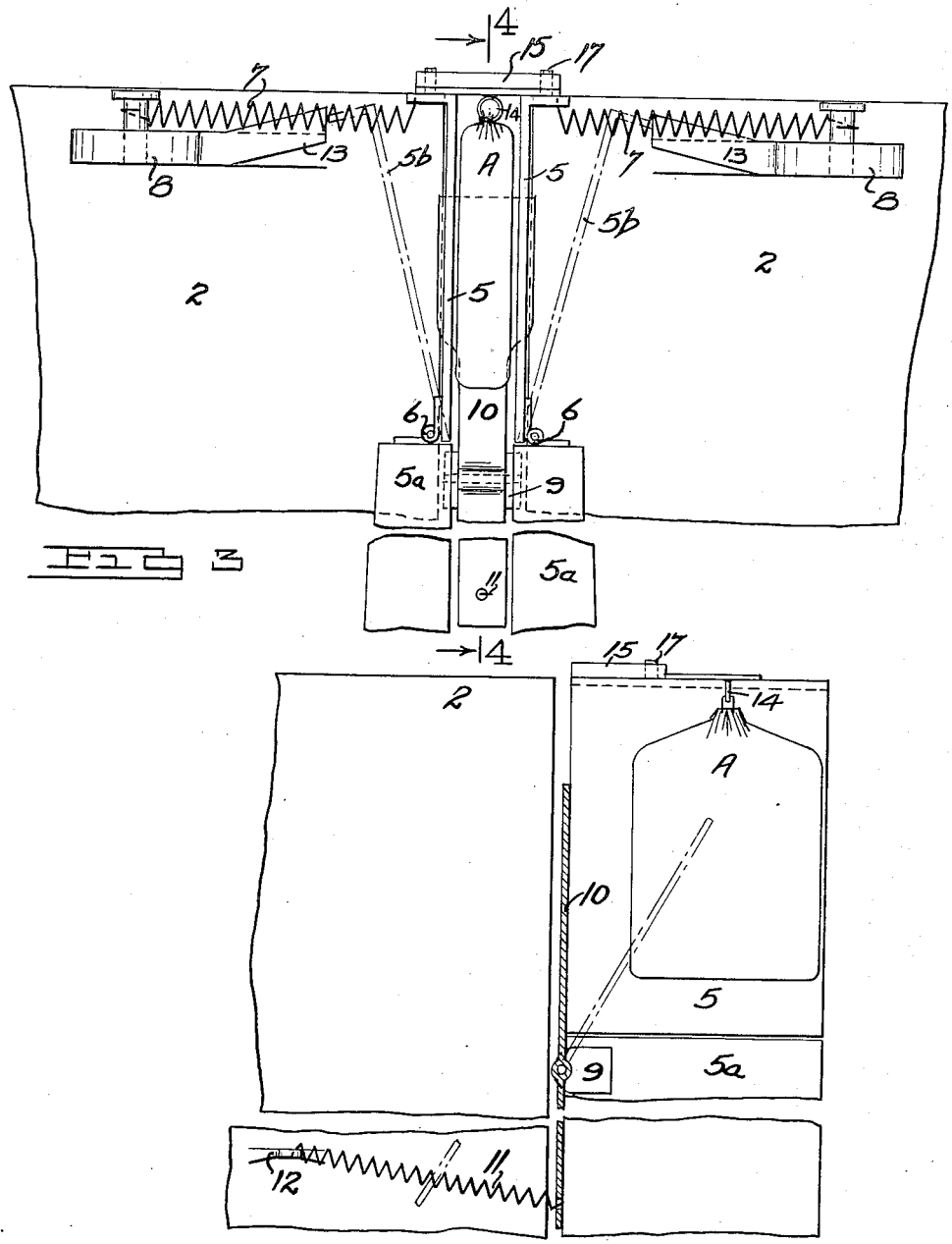

Patented May 7, 1935

2,000,154

UNITED STATES PATENT OFFICE 2,000,154

PICK-UP AND DELIVERY SYSTEM

Edward John White and Arthur S. Garove, Detroit, Mich.

Application April 16, 1934, Serial No. 720,738

8 Claims. (Cl. 258—1)

This invention relates to improvements in pick-up and delivery systems, and while applicable of handling various types of material, is primarily intended for picking up and delivering mail bags from passing airplanes.

It is an object of the invention to provide a relatively cheap and simple form of pick-up and delivery system consisting of a ground station and a travelling element; and wherein the load to be picked up from the ground station automatically disengages the load to be delivered from the travelling element.

Another object of the invention is to provide a pick-up and delivery system wherein the travelling element consists of a cable having a control member depending therefrom; wherein the loads to be picked up and delivered each have a trip plate secured thereto; and wherein the trip plate on the load to be delivered is supported by a movable catch on the control member which is actuated to drop its trip plate and load by the other trip plate secured to the load to be picked-up when the said other trip plate is engaged by the cable and exerts downward pressure upon the top of the control member which is then lifted from the ground station.

A further object of the invention is to provide a pick-up and delivery system wherein the ground station consists of converging walls upon the upper faces of which inwardly projecting hinged guides are arranged with their inner ends almost contiguous and terminate immediately in front of the trip plate to be picked up which is detachably mounted on laterally spaced uprights that also form a portion of the ground station. Thus means are furnished for relatively exact guidance of the cable and control member of the travelling element into engagement with the trip plate to be picked up, and greater width is provided beneath the guides to permit passage of a relatively bulky load.

Yet another object of the invention is to provide such a pick-up and delivery system wherein both the control member and the trip plate are both simple to manufacture and efficient in operation.

Having thus briefly enumerated some of the major objects and advantages of the invention, we will now proceed to describe a preferred embodiment of the system with the aid of the accompanying drawings, in which:

Figure 1 is a plan view of the system.

Figure 2 is a side view of Figure 1.

Figure 3 is a partial front elevation on the line 3—3 of Figure 1.

Figure 4 is a section on the line 4—4 of Figure 3.

Figure 5 is a front elevation of the control member showing the housing in section.

Figure 6 is a side elevation of Figure 5, also with the housing in section.

Figure 7 is a view similar to Figure 6, but showing the slide in its raised position.

Figure 8 is an enlarged inverted plan view of Figure 6.

Figure 9 is an enlarged section on the line 9—9 of Figure 6.

Figure 10 is a front view of the trip plate, and

Figure 11 is a side view thereof.

Referring to the drawings, the ground station consists essentially of two suitably braced converging walls 2, and two spaced uprights 5 in front of the adjacent extremities of these walls. Upon the upper faces of the latter towards their converging extremities guides 3 are mounted with spring hinges 4 so that their adjacent margins normally extend inwardly from the walls 2 as clearly shown in Figure 1. 2a and 2b indicate reinforcements which we prefer to utilize as the walls 2 are generally built to a considerable height.

The uprights 5, when vertically disposed, are spaced sufficiently from one another to permit the insertion of a mail bag A or other package between them. The lower extremities of these uprights are pivotally mounted upon lower stationery portions 5a of the uprights by hinges 6, which, as shown in Figure 3, swing outwardly about horizontal axes. Connected to each of the uprights 5 and to its upper extremity is a spring 7 which is also anchored to a fixed portion of the station, in the present instance to arms 8 formed integral with the walls 2. The purpose of the springs 7 is to pull the uprights 5 outwardly into their positions indicated at 5b when they are not otherwise held in their vertical positions.

Secured to the stationary lower portions 5a of the uprights are bearings 9 between which a booster 10 is pivotally mounted. The upper portion of the latter is wider than the spacing between the pivoted uprights 5 when the latter are vertically positioned, and rests normally against the vertical faces of the said uprights adjacent the walls 2. Secured to the lower extremity of the plate 10 is one end of a spring 11 the opposite extremity of which is secured to a suitably located portion of the station, in the present instance to a projection 12 extending inwardly from and integral with one of the walls 2. Consequently when the uprights 5 are moved pivotally outward by the springs 7 passage of the booster 10 between the said uprights is permitted, and the latter is swung rapidly forward by the spring 11. The outward movement of the uprights 5 is limited by suitably arranged stops 13, which, in the present instance, are formed integral with the arms 8.

Each mail bag or package A is held as by rings 14 to a trip plate 15, shown in detail in Figures 10 and 11. Formed through each plate 15 are two apertures 16 to engage projections 17, one of which extends upwardly from each upright 5. Thus the uprights are normally retained in their vertical positions by a trip plate. Formed through each of the latter are two slots 18 and 19; the former is an open-ended slot normally closed at its outer extremity by a spring actuated latch 20, which, when contacted on its outer face, swings inward to permit entry into the said slot 18.

The travelling element consists of a control member 21 mounted on the lower extremity of a cable 22 suspended from a moving body (not shown.). Around the member 21 and forming a portion thereof is a tubular housing 23 through the top of which the cable 22 extends. Secured in the housing 23 as by pins 24 is a guide 25 on which a slide 26 is vertically movable; the cable 22 is secured to the top of the latter. Formed in the underside of the guide 25 is a vertically inclined transverse groove 27. Pivoted in the lower portion of the slide 26 is a lever 28 the upper extremity of which is slidable in the inclined groove 27 as the said lever turns about its pivotal mounting. Formed on the lower portion of the lever 28 is a stepped catch 29 which is normally held by a spring 31 between two open-ended slots 30 formed in the lower extremity of the housing 23. When a trip plate 15 is inserted into the slots 30 as indicated at 15a in Figure 6 the tapered underside of the catch 29 is contacted and sufficient pressure exerted upon the latter by the plate causes the said catch to swing against the tension of the spring 31 and admit the said plate. As soon as the latter has entered sufficiently for the slot 19 to come opposite the catch 29 the latter enters the former and supports the trip plate 15 and the bag A carried thereby. Here it must also be noted that the spring 31 must be strong enough to withstand the turning tendency exerted upon the catch 29 by the weight of the bag A. It will also be noted that when pressure is exerted upon the top of the housing 23 upward movement of the slide 26 occurs with the result that the lever 28 is moved pivotally against the tension of the spring 31, that is from its position shown in Figure 6 to that shown in Figure 7. Thus sufficient pressure exerted upon the top of the housing to overcome the tension of the spring 31 causes the release of the trip plate 15 carried by the catch 29.

The operation of the system is briefly as follows: The rope 22 and member 21 are guided by the converging walls 2 and the guides 3 so that the said rope contacts a trip plate 15 mounted on the projections 17. The rope presses back the latch 20 and enters the slot 18, so that the trip plate 15 is then engaged as indicated at 15b in Figure 7. Continued travel of the rope or cable causes it to bring the upper extremity of the member 21 into contact with the underside of the trip plate. Due to the weight of the latter and of the mail bag A depending from it, and also to the effort required to raise the trip plate from its projections 17 sufficient pressure is exerted against the top of the housing 23 to cause the slide 26 to be raised and the lever 28 to be moved pivotally against the tension of the spring 31. Then, as already explained, the catch 29 moves and drops the trip plate supported by it. Thus the action of raising one trip plate 15 off its projection 17 causes the member 21 to drop the other trip plate carried by the catch 29. As soon as the trip plate upon the uprights 5 is removed the latter are swung outward by the springs 7, and the booster 10 then swings about its pivotal mounting, actuated by the spring 11, and imparts initial movement to the bag A which is being picked up in the direction of movement of the cable 22 and member 21.

While in the foregoing the preferred embodiment of the invention has been described and shown, it is understood that the construction thereof is susceptible to such modifications and alterations as fall within the scope of the appended claims.

What we claim is:

1. A pick-up and delivery system of the character described comprising a ground station consisting of converging vertical walls, pivoted guides extending towards one another from the upper faces of the walls, means tending to hold the guides in their inward extending positions, pivoted transversely spaced uprights in front of the adjacent extremities of the walls, a travelling element consisting of a cable having a control member depending therefrom, two trip plates having loads secured thereto, means on the uprights detachably supporting one trip plate, the latter being adapted to hold the uprights adjacent one another, means tending to move the uprights pivotally away from one another, means on the trip plate upon the uprights for engaging the cable so that said cable may slide through that trip plate until said trip plate rests upon the control member, a movable catch in the control member supporting the second trip plate, means actuated by the weight of the first trip plate upon the control member for releasing the catch from the second trip plate, a booster, and means actuating the latter when the uprights move away from one another.

2. A pick-up and delivery system comprising a ground station and a travelling element consisting of a cable having a control member depending therefrom, two identical trip plates to each of which a package is secured, means on the ground station detachably supporting one trip plate, a pivoted catch in the control member, the second trip plate being supported by the catch, means on the first trip plate for engaging the cable so that the latter may slide through said trip plate until it rests upon the control member, and means in the control member actuated by the weight of the first trip plate thereon for moving the catch pivotally and releasing the second trip plate.

3. A pick-up and delivery system comprising a ground station and a travelling element consisting of a cable having a control member depending therefrom, a trip plate, means on the ground station detachably supporting the trip plate, a slide vertically movable in the control member to which the lower extremity of the cable is secured, a guide in said member for said slide, a lever pivoted on said slide, means moving the lever pivotally when the slide moves on its guide, a catch on the lever, a second trip plate supported by the catch, means on the first trip plate for engaging the cable so that the latter may slide therethrough until said trip plate rests upon the control member, the weight of the first trip plate upon the control member moving the slide upwardly in the latter, said slide movement moving the lever and disengaging the catch from the second trip plate.

4. A trip plate consisting of a plate, said plate having spaced apertures formed therethrough for detachably mounting it upon a ground station, said plate having an open-ended slot therein extending between said apertures, a spring actuated latch normally closing the slot, and said plate having a second slot therethrough to receive a carrying catch.

5. A control member consisting of a housing, a fixed guide therein, a slide vertically movable on said guide, a cable secured to the upper extremity of the slide and dependingly supporting the member, a lever pivoted on said slide, a catch on said lever, the lower extremity of the housing having opposed open-ended slots formed therein to receive a trip plate, a spring normally holding the catch between the slots to engage the trip plate, and an inclined slot formed transversely of the guide within the housing coacting with the lever for moving the catch pivotally from between the slots to release the trip plate when the slide is moved.

6. A ground station consisting of converging guides, uprights transversely spaced in front of the adjacent extremities of the guides, said uprights being pivoted to swing away from one another, springs tending to swing said uprights outwardly, stops to limit the outward movement of the uprights, a trip plate, a load depending therefrom, a booster pivoted beneath the uprights, means tending to move the booster so that the upper portion thereof strikes the load and imparts substantially horizontal motion thereto, the booster being held against movement by the uprights until they swing outwardly, means upon the uprights detachably engaging the trip plate so that the latter holds the uprights against outward pivotal movement, and a travelling element adapted to engage the trip plate and remove it from the uprights.

7. A pick-up and delivery system of the character described comprising a ground station consisting of two converging guides, pivoted uprights transversely spaced in front of the adjacent extremities of said guides, a trip plate detachably mounted upon both of said uprights having a package depending therefrom beneath said uprights, a travelling element including a control member adapted to engage said trip plate and lift it off said uprights, means moving said uprights pivotally outwards from one another when the trip plate is disengaged, a booster the opposite margins of which normally rest against said uprights, and means moving said booster rapidly between said uprights to impart momentum to the package when the uprights move pivotally away from one another.

8. A pick-up and delivery system comprising a ground station including two converging guides, pivoted uprights transversely spaced in front of the adjacent extremities of said guides, a trip plate detachably mounted upon both of said uprights having a package depending therefrom between said uprights, a travelling element including a control member adapted to engage said trip plate and lift it off the uprights, means moving the uprights pivotally outwards from one another when the trip plate is lifted therefrom, a booster which normally rests against said uprights, means moving the booster rapidly between the uprights when the latter swing outwardly to impart momentum to the package, a second trip plate dependingly supporting a package carried by the control member, and means in the control member actuated by the weight of the first named trip plate adapted to release said second trip plate as the first trip plate is lifted from said uprights.

EDWARD JOHN WHITE.
ARTHUR S. GAROVE.